(12) United States Patent
Getz et al.

(10) Patent No.: US 6,627,918 B2
(45) Date of Patent: Sep. 30, 2003

(54) SPACER ELEMENTS FOR INTERACTIVE INFORMATION DEVICES AND METHOD FOR MAKING SAME

(75) Inventors: Catherine A. Getz, Holland, MI (US); Martin Mennig, Fischbach (DE)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/954,139

(22) Filed: Sep. 17, 2001

(65) Prior Publication Data

US 2002/0094660 A1 Jul. 18, 2002

Related U.S. Application Data

(60) Provisional application No. 60/234,867, filed on Sep. 22, 2000.

(51) Int. Cl.$^7$ .............................................. H01L 29/04
(52) U.S. Cl. ........................................... 257/59; 178/18
(58) Field of Search ................ 257/59, 72; 178/18–20

(56) References Cited

U.S. PATENT DOCUMENTS

| | | | |
|---|---|---|---|
| 4,864,084 A | * 9/1989 | Cardinale | 200/5 A |
| 5,062,198 A | * 11/1991 | Sun | 29/622 |
| 5,239,152 A | 8/1993 | Caldwell et al. | 200/600 |
| 6,218,679 B1 | * 4/2001 | Takahara et al. | 257/59 |
| 6,395,863 B2 | * 5/2002 | Geaghan | 528/196 |

* cited by examiner

Primary Examiner—David Nelms
Assistant Examiner—Quoc Hoang
(74) Attorney, Agent, or Firm—Van Dyke, Gardner, Linn & Burkhart, LLP

(57) ABSTRACT

An interactive information device for use as a touch panel, touch screen, digitizer panel, or pen-input device, and a method for making such a device includes a first, transparent, electrically conductive layer supported by the rigid substrate, a flexible, transparent substrate at least partially aligned with the rigid substrate and having a second, transparent, electrically conductive layer on a surface thereof, the second conductive layer being spaced from the first conductive layer. A plurality of transparent insulating spacer members/dots are positioned on one or both of the conductive layers to allow the conductive layers to engage when the flexible substrate is pressed. The spacer members/dots comprise polymeric material including at least some inorganic material, and more preferably, comprise organic-inorganic nanocomposites having an index of refraction optically matched to the transparent, electrically conductive layer on which they are positioned.

25 Claims, 3 Drawing Sheets

SPACER ELEMENTS FOR INTERACTIVE INFORMATION DEVICES AND METHOD FOR MAKING SAME

CROSS REFERENCE TO RELATED APPLICATION

This application claims priority form U.S. Provisional Patent Application Serial No. 60/234,867, filed Sep. 22, 2000, the disclosure of which is hereby incorporated by reference herein.

BACKGROUND OF THE INVENTION

This invention relates to an improved technology for the separation of a rigid, transparent, conductively coated substrate and a flexible, transparent, conductively coated top sheet as used in an interactive information device such as a computer touch panel, a digitizer panel, a personal digital assistant known as a PDA, or a computer pen input device.

In an interactive information device having opposing conductive surfaces on a flexible top sheet and a rigid bottom sheet, "spacer dots", or the like, are non-conductive insulating islands or spacer elements that separate the transparent conductively coated rigid substrate from the flexible transparent conductively coated top sheet in a touch input device when in its normal, untouched condition. When a user presses on the top sheet, such as with a finger or stylus, the flexible transparent conductive substrate is forced to make contact with the transparent conductively coated rigid substrate creating an electrical circuit for touch detection. When the device is not being touched, it is important that the flexible top sheet and the rigid back substrate do not come into contact so as to avoid creating a false touch. It is also desired that the spacer dots or elements be of minimal visibility for optimal optical performance of the information device.

SUMMARY OF THE INVENTION

The present invention includes an improved process and improved materials for producing uniformly dispersed, consistent, durable, essentially non-visible, fixed substrate-interpane-spacer elements (for example "spacer dots") for spacing the opposing conductive surfaces of the flexible top sheet and rigid bottom sheet of an interactive information device.

The invention is most effectively accomplished by the application of the non-conducting spacer dots or elements on the rigid substrate of the interactive information device using appropriately tall dots or elements separating the sheets well apart for optimum electrical performance (non false—touch) while minimizing visibility for optimum optical performance (such as by rendering the dots invisible such as by index matching the dot material to the surrounding interpane medium and/or by having a small dot diameter and/or by having few, well spaced dots). It is preferred that the performance be further improved by the use of spacer dot materials that are optically matched to the transparent conductors, typically indium tin oxide. It is preferred that the registration and/or orientation of the dots on the glass be matched to the particular touch screen design. It is preferred that the placement of the dots on the glass allow for manufacturability of more than one touch device per coated stock sheet, known as "stock sheet" or "stock lite" form substrates. It is also preferred that the spacer dots be durable to withstand post-processing requirements such as washing, cutting, baking, and the like, for the manufacturing of the touch devices.

DESCRIPTION OF THE PREFERRED EMBODIMENTS

Figure 1:
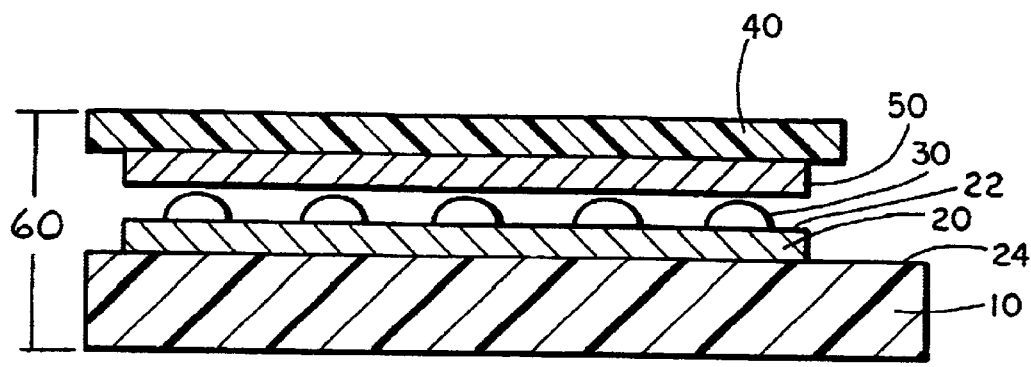
FIG. 1 is a sectional, side elevation of an interactive information device incorporating the improved spacer elements of the present invention.

More specifically, and as shown in FIG. 1, this invention relates to the improved process and materials resulting in an interactive information device such as a resistive touch device 60 comprising rigid substrate 10 such as soda lime glass with a transparent conductive thin film 20. The spacer dots or elements 30 are deposited most preferably by silk screen methods on thin film 20. The flexible substrate 40 with transparent conductive thin film 50 provides the top sheet of the resistive touch device 60. Optionally, the transparent substrate 10 of the present invention may be an optical plastic comprising a conductively coated cyclic olefin copolymer plastic substrate as disclosed in U.S. patent application Ser. No. 09/946,228, filed Sep. 5, 2001, entitled IMPROVED PLASTIC SUBSTRATE FOR INFORMATION DEVICES AND METHOD FOR MAKING SAME, the disclosure of which is hereby incorporated by reference herein in its entirety. Such rigid plastic substrate may be formed from a cyclic olefin copolymer (COC) such as is available from Ticonca of Summit, N.J., under the trade name "Topas." Cyclic olefin-containing resins provide an improved material for a rigid, transparent conductively coated substrate suitable for use in an information display. The improved information display incorporating the improved plastic substrate is lightweight, durable, flex resistant, dimensionally stable and break resistant as compared to other, more conventional substrates. A rigid plastic substrate can be formed by extrusion, casting or injection molding. When injection molding is used such as when forming a substrate from a cyclic olefin copolymer (COC), a non-planar curved (spherical or multiradius) part can be formed, optionally with at least one surface roughened (such as by roughening/patterning a surface of the tool cavity used for injection molding) so as to have a light-diffusing, anti-glare property.

A transparent, plastic substrate such as one formed from cyclic olefin polymer resin can be used to form a rigid panel or back plate for use in a resistive membrane touch device where the cyclic olefin panel functions as a transparent back plate for a flexible, conductive, transparent touch member assembly as is also described in U.S. patent application Ser. No. 09/946,228, filed Sep. 5, 2001, incorporated by reference above.

The transparent thin film conductors 20 and 50 are typically metal oxides such as indium tin oxide, tin antimony oxide, fluorine doped tin oxide, or tin oxide. The spacer dots 30 preferably consist of organic-inorganic nanocomposites (Nanomeres®) utilizing methyl tetraethylorthosilicate, tetraethylorthosilicate, or glycidoxypropyltrimethoxysilane as network formers hydrolyzed using hydrochloric acid prepared initially in a paste form. Silica sols, silica powders, ethyl cellulose, and hydroxypropyl cellulose may be utilized as additives to adjust viscosity. Cyracure, (Union Carbide, UV 6974) serves as the photoinitiator allowing for the use of ultraviolet light for curing. The resulting improved spacer dots 30 can be enhanced optically by nano-particle metal oxides and pigments such as titanium dioxide ($TiO_2$), barium titanium oxide (BaTiG), silver (Ag), nickle (Ni), molybdenum (Mo), and platinum (Pt). The resulting index of refraction of the dots 30 for substantial optical matching to the transparent conductor is preferably about 1.49 to about 2.0, most preferably about 1.75 to about 1.95 (for light having a wavelength at the sodium D line, i.e., at about 589 nanometers).

Figure 3:
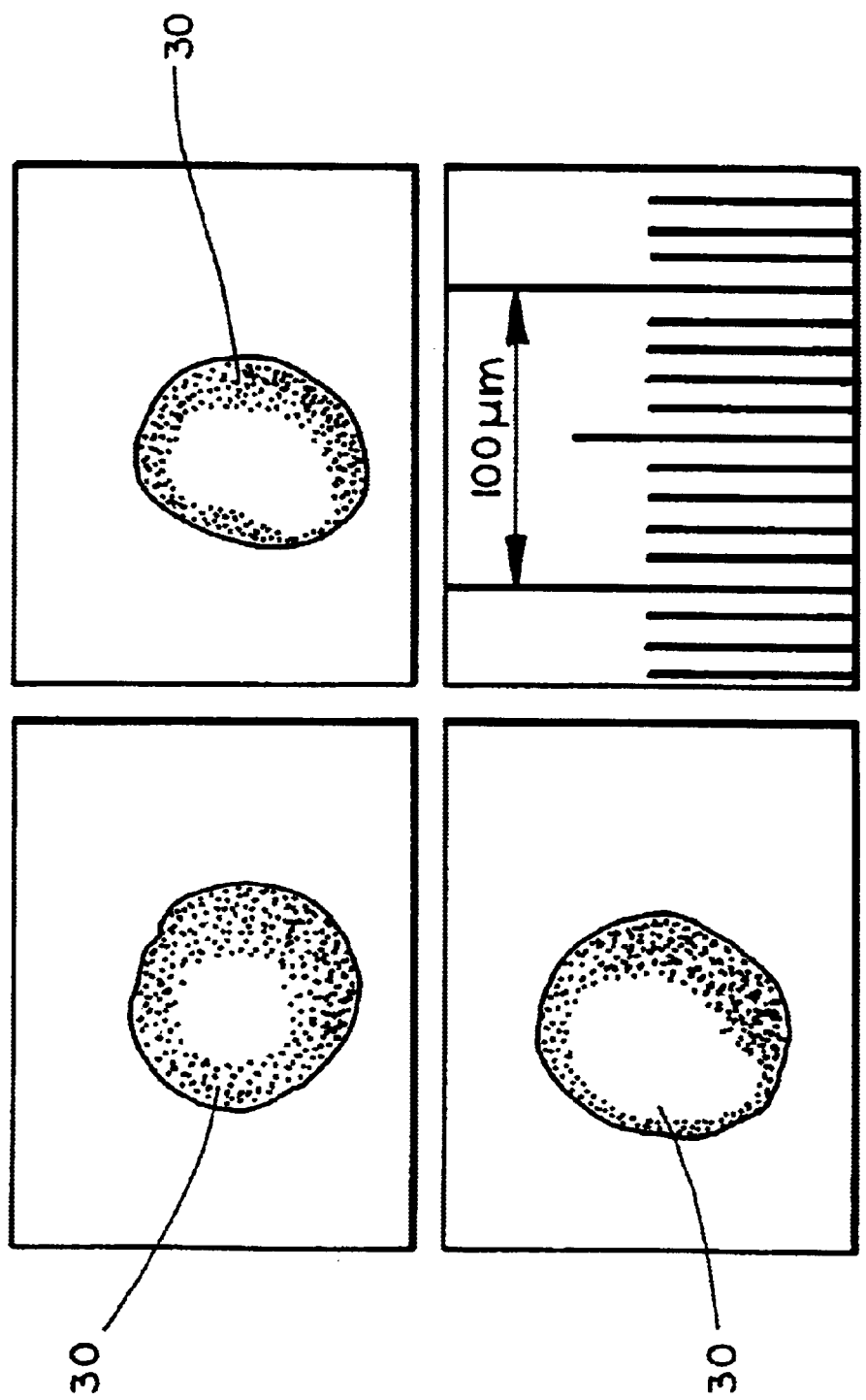
FIG. 3 is a photograph of exemplary spacer elements in accordance with the present invention.

The preferred spacer dots, such as those shown in FIG. 3, are produced by silk screen printing using fine mesh sieves with appropriate hole patterns. The nanoparticles can be used to adjust the refractive index of the dots easily; for example, the nanoparticles can include silicon dioxide for decreasing the index; or zirconium dioxide, titanium dioxide, and tantalum pentoxide for increasing the refractive index. The nanoparticles can be used to adjust the viscosity of the paste. The incorporation of nanoparticles leads to reduced shrinkage during the curing of the spacer dots. The ultraviolet (UV) curable silk screen printing paste is preferably synthesized using a nanocomposite material as described in U.S. Pat. No. 5,910,522 "Composite Adhesive for Optical and Opto-Electronic Applications" by Institut fur Neue Materialien gemeinnutzige GmbH, Saarbrucken Germany, invented by Helmut Schmidt, Saarbrucken-Gudingen et al, dated Jun. 8, 1999, the entire disclosure of which is hereby incorporated by reference herein. The preferred screening paste contains the following:

a) transparent polymers and/or polymerizable oligomers and/or monomers, b) nanoscale inorganic particles, c) optionally, compounds for the surface modification of said inorganic particles, d) optionally, a crosslinking initiator.

In some forms of the invention, it may be useful to incorporate a reduced glare, conductive coated panel having increased visible light transmission and suitable for use as a touch screen, digitizer panel or substrate in an information display and incorporating one or more thin film interference layers forming a thin film stack on opposite surfaces of a substrate such as that described herein and a transparent electrically conductive coating on the outer most layer of one or both of the thin film stacks, such as described in U.S. patent application Ser. No. 09/883,654, filed Jun. 18, 2001 entitled ENHANCED LIGHT TRANSMISSION CONDUCTIVE COATED TRANSPARENT SUBSTRATE AND METHOD FOR MAKING SAME, the disclosure of which is hereby incorporated by reference herein.

The present invention may also include the use of a reduced contrast, increased transmission, conductively coated panel wherein optical in-homogeneity is reduced between the transparent conductively coated regions and the non-coated regions rendering these delineation regions essentially visually indistinguishable when viewed so that there is no substantial contrast apparent when viewed in reflected light as described in U.S. provisional patent application Serial No. 60/239,788, filed Oct. 12, 2000, entitled REDUCED CONTRAST IMPROVED TRANSMISSION CONDUCTIVELY COATED TRANSPARENT SUBSTRATE, the disclosure of which is hereby incorporated by reference in its entirety.

Figure 2:
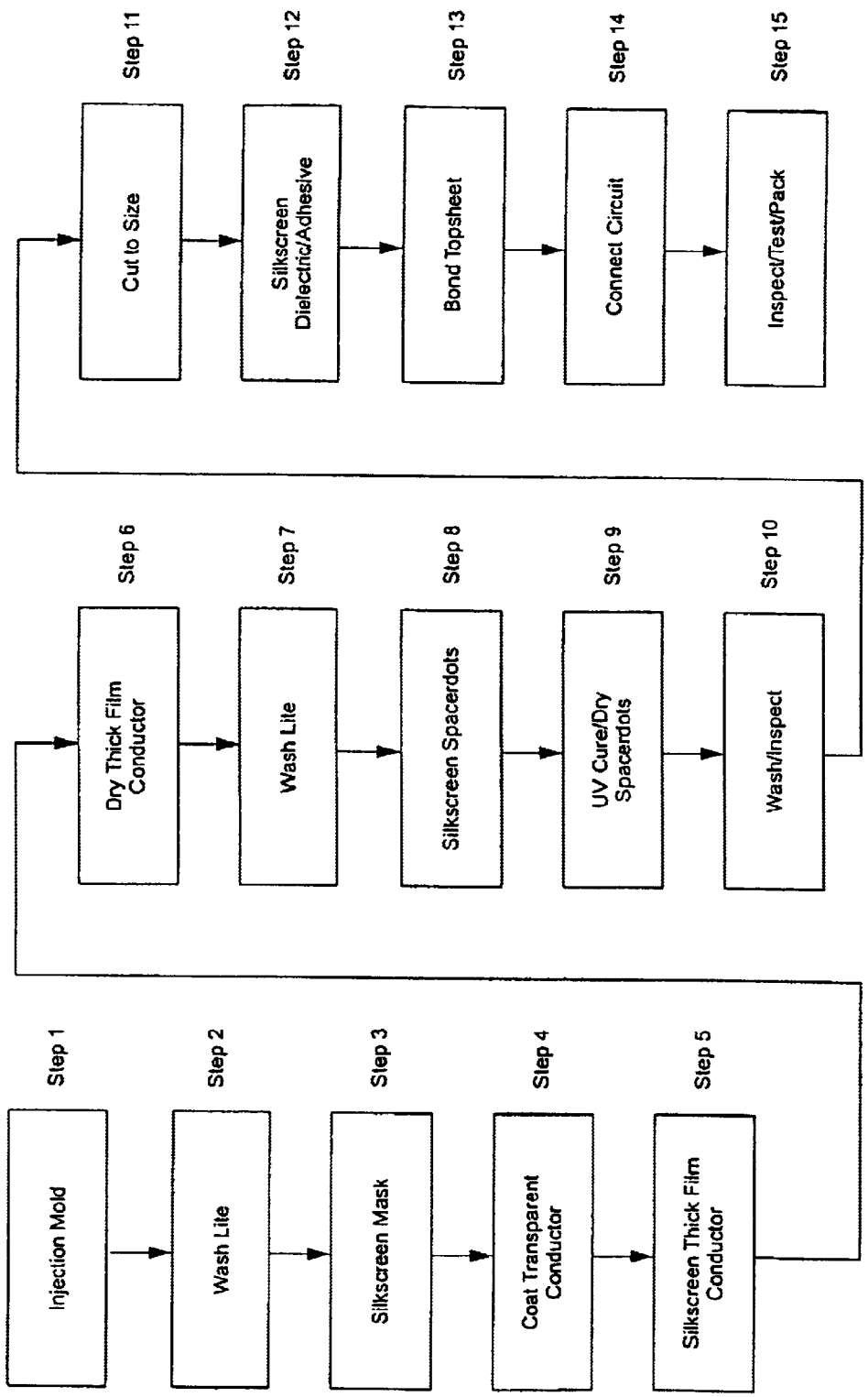
FIG. 2 is a flow diagram of a preferred method for making the interactive information device of FIG. 1 incorporating the present invention.

The preferred process, and as shown in FIG. 2, for the application of the spacer dots 30 starts with the use of conventional glass cleaning techniques for preparation of the transparent conductively coated rigid substrate or lite 10. The substrate is in the form known as stocksheet allowing for the subsequent cutting from and manufacture of multiple touch devices from one lite. Lites can be processed in the flat or bent product configuration. Prior to the deposition of the transparent conductor thin film 20, a pattern of a mask material may be applied to the raw glass using a silk screen coating method, 325-mesh stainless steel screen. This allows removal of the thin film conductor, indium tin oxide for example, in the areas coated with the mask material following the deposition of the conductive film. The conductive thin film 20, indium tin oxide, is then deposited on surface 24 of the lite, over any mask material, preferably by the sputtering physical vapor deposition technique or evaporation physical vapor deposition technique. A thick film conductive electrode pattern, typically a silver frit such as Dupont 7713, is then applied using a silk screen coating method, 325 stainless steel mesh silk screen with glass frit as required based on the touch screen design. The thin film conductor 20 and the thick film conductor are then cured using a conventional baking process, such as 480 degrees C. for 60 minutes. The thin film may be chemically reduced in an inert forming gas curing environment. Following curing of the thick film and thin film conductors, the coated lite is washed using conventional glass washing techniques. This prepares the lite for the application of the spacer dots and removes residual mask material for the deletion of specific areas of the thin film conductor as required by the touch screen design. The transparent conductor may also be deleted in selected areas following curing using photolithography or laser deletion methods.

The spacer dots 30 are then applied to the transparent conductor 20 on substrate or lite 10 using conventional silk screening techniques using a 400-mesh stainless steel. Alternately, the dots 30a, may be applied to surface 51 of transparent conductor 50 or to both conductors 20 and 50 as described below. The dots are arranged in an orientation based on the design of the touch screen. Optimum design calls for dots 30 to be non-visible minimizing diameter with maximum height for electrical functionality. Spacer dot dimensions for width are about 125 microns to about 15 microns, preferably about 100 microns to about 25 microns, most preferably about 80 microns to about 40 microns in diameter. Spacer dot dimensions for height are about 25 microns to about 3 microns, preferably about 15 microns to about 5 microns, most preferably about 12 microns to about 8 microns. The spacer dots are then cured using ultraviolet light energy level of less than about 1000 mJ/cm2, preferably less than about 500 mJ/cm2, most preferably less than about 400 mJ/cm2 and/or drying at less than about 300 degrees C. for less than about 40 minutes, preferably less than about 200 degrees C. for less than about 20 minutes, most preferably less than about 100 degrees C. for less than about 10 minutes. The coated lites with dots 30 thereon are then washed using conventional glass washing techniques, inspected, and cut to final touch screen dimensions using conventional glass cutting techniques. Dielectric materials and adhesives are applied to the resulting rigid glass coated substrate. The flexible conductive top sheet 40 is then bonded to the conductive glass substrate 10 with the spacer dots 30 separating the top sheet from the coated glass substrate. A flexible electric connector is electrically connected to the complete assembly for attachment to the information device. The device is then inspected and tested electronically. The resulting product is the complete interactive information device 60.

Figure 1A:
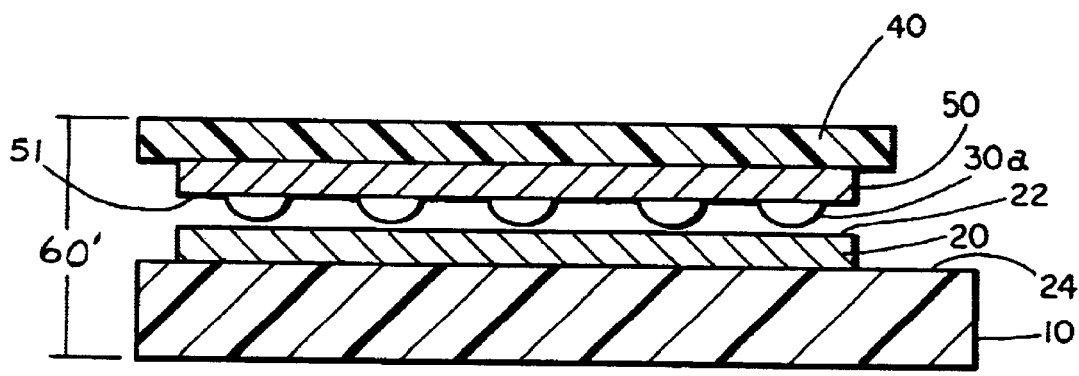
FIG. 1A is a sectional, side elevation of a second embodiment of the interactive information device of the present invention.

Alternately, as shown in embodiment 60' in FIG. 1A, transparent, insulating spacer members or dots 30a, which are substantially similar to spacer dots 30 described above, may be arranged and located on surface 51 of conductive thin film coating 50 in the same manner as described above for dots 30 on surface 22 also to avoid false-touch sensing of the touch screen.

Figure 1B:
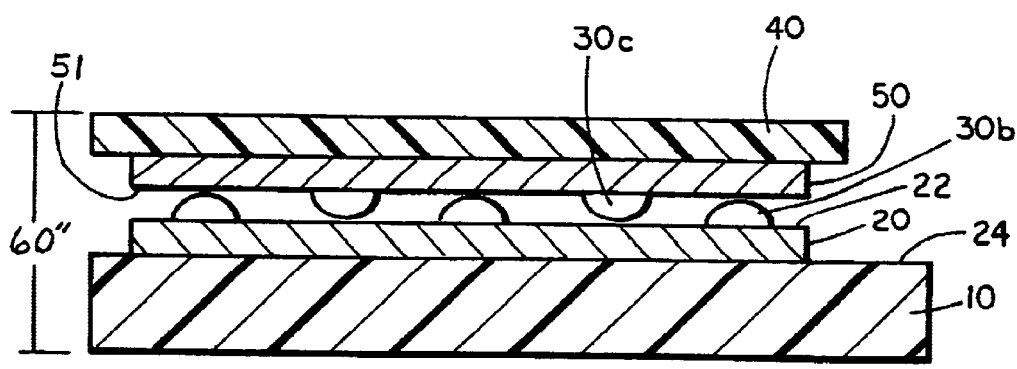
FIG. 1B is a sectional, side elevation of a third embodiment of the interactive information device of the present invention.

In yet another embodiment 60", shown in FIG. 1B, spacer members or dots 30b may be located and arranged on surface 22 of conductive coating 20 while spacer members 30c may be arranged and located on surface 51 of conductive thin film coating 50. Spacer members or dots 30b and 30c are substantially similar to spacer members or dots 30 described above. In embodiment 60", however, spacer dots 30b, 30c alternate on opposite sides of the gap on coatings 20, 50 and are spaced at greater a distance from one another on each of the opposing surfaces so as not to be aligned with or engage one another but allow the conductive coatings 20, 50 to engage one another between the spacer dots when flexible film 40 is touched or pressed.

EXAMPLE

A preferred synthesis for the spacer dot paste was produced with a mixture of 118.2 g glycidoxypropyltrimethoxysilane, 13.5 g bidistilled water and 4 g hydroxypropyl cellulose refluxed for 24 hours. The mixture was filtered afterwards. In addition, a mixture of 10 g of 30% by weight colloidal silicon dioxide in isopropanol and 2.4 mg 40% by weight tetrahexylammoniumhydroxide in water was produced under stirring. 20 g of glycidoxypropyltrimethoxysilane and 3 g of 30% by weight colloidal silicon dioxide in isopropanol/40% by weight tetrahexylammoniumhydroxide in water mixture were mixed, water and alcohol were removed by distillation (temperature at 60 degrees C., pressure at 200 mbar, removal of 25.4% of the mixture). Afterwards 2 weight percent of the photoinitiator Union Carbide Cyracure UVI 6974 were added.

While several forms of the invention has been shown and described, other forms will now be apparent to those skilled in the art. Therefore, it will be understood that the embodiments shown in the drawings and described above are merely for illustrative purposes, and are not intended to limit the scope of the invention which is defined by the claims which following including the doctrine of equivalents.

The embodiments of the invention in which an exclusive property or privilege is claimed are as follows:

1. An interactive information device comprising:
   at least one rigid, transparent substrate;
   a first transparent, electrically conductive layer supported by a surface of said rigid substrate;
   a flexible transparent substrate at least partially aligned with said rigid substrate, said flexible substrate having a surface which faces said surface of said rigid substrate, and a second transparent, electrically conductive layer on said surface of said flexible substrate; said flexible substrate being spaced from said rigid substrate to provide a gap between said conductive layers;
   a plurality of insulating spacer members on at least one of said electrically conductive layers whereby said flexible substrate may be flexed by pressing to engage said electrically conductive layers; and
   wherein said spacer members comprise polymeric material including at least some inorganic material;
   said inorganic material comprising nanoscale particles.

2. The interactive information device of claim 1 wherein said nanoscale particles include nano-particle metal oxides.

3. The interactive information device of claim 2 wherein said nanoscale particles include a pigment.

4. The interactive information device of claim 2 wherein said nano-particle metal oxides include material selected from the group consisting of titanium dioxide, barium titanium oxide, silicon oxide, zirconium dioxide, tantalum pentoxide, silver, nickel, molybdenum and platinum.

5. The interactive information device of claim 1 wherein said spacer members have an index of refraction of at least about 1.49 for light at a wavelength of about 589 nanometers.

6. The interactive information device of claim 1 wherein said spacer members have an index of refraction within the range of about 1.49 to about 2.0 for light at a wavelength of about 589 nanometers.

7. The interactive information device of claim 1 wherein said spacer members have an index of refraction of about 1.75 to about 1.95 for light at a wavelength of about 589 nanometers.

8. The interactive information device of claim 1 wherein said spacer members have an index of refraction substantially optically matched to the index of refraction of the transparent, electrically conductive layer on which they are positioned.

9. The interactive information device of claim 1 wherein at least one of said spacer members comprises a width dimension of at least about 15 microns.

10. The interactive information device of claim 9 wherein at least one of said spacer members comprises a height dimension of at least about 3 microns.

11. The interactive information device of claim 9 wherein at least one of said spacer members comprises a height dimension of about 3 microns to about 25 microns.

12. The interactive information device of claim 1 wherein at least one of said spacer members comprises a width dimension of about 15 microns to about 125 microns.

13. The interactive information device of claim 1 wherein at least one of said spacer members comprises a height dimension of at least about 3 microns.

14. The interactive information device of claim 1 wherein at least one of said spacer members comprises a height dimension of about 3 microns to about 25 microns.

15. The interactive information device of claim 1 wherein said spacer members are formed from a compound containing at least one of transparent polymers, polymerizable oligomers, and monomers.

16. The interactive information device of claim 1 wherein said spacer members further contain at least one of a compound for the surface modification of said inorganic material and a cross-linking initiator.

17. The interactive information device of claim 1 wherein said spacer members are formed from a compound which includes a photo initiator and is ultraviolet curable.

18. The interactive information device of claim 1 wherein said spacer members comprise organic-inorganic nanocomposites.

19. The interactive information device of claim 18 wherein said organic-inorganic nanocomposites utilize a network former which is hydrolyzed and prepared initially in paste form.

20. The interactive information device of claim 19 wherein said network former is selected from the group consisting of methyl tetraethylorthosilicate, tetraethylorthosilicate, and glycidoxypropyltrimethoxysilane.

21. The interactive information device of claim 1 wherein each of said first and second transparent, electrically conductive layers comprises a metal oxide.

22. The interactive information device of claim 21 wherein said metal oxide is selected from the group consisting of indium tin oxide, tin antimony oxide, tin oxide, and fluorine doped tin oxide.

23. The interactive information device of claim 1 wherein said insulating spacer members are transparent, are spaced from one another, and are located on said first transparent, electrically conductive layer.

24. The interactive information device of claim 1 wherein said insulating spacer members are transparent, are spaced from one another, and are located on said second transparent, electrically conductive layer.

25. The interactive information device of claim 1 wherein said insulating spacer members are transparent, are spaced from one another, and are located on both said first and second transparent, electrically conductive layers, said spacer members being spaced apart on said first and second conductive layers such that said spacer members allow said conductive layers to engage one another when said flexible transparent substrate is pressed.

* * * * *

UNITED STATES PATENT AND TRADEMARK OFFICE
CERTIFICATE OF CORRECTION

PATENT NO. : 6,627,918 B2  
APPLICATION NO. : 09/954139  
DATED : September 30, 2003  
INVENTOR(S) : Catherine A. Getz and Martin Mennig Page 1 of 1

It is certified that error appears in the above-identified patent and that said Letters Patent is hereby corrected as shown below:

Column 3:
Line 10, "(BaTiG)" should be --(BaTiO)--.

Signed and Sealed this

Third Day of October, 2006

JON W. DUDAS  
*Director of the United States Patent and Trademark Office*